Dec. 15, 1925.
L. OBRECHT
1,565,385
SPRING ATTACHMENT
Filed April 4, 1925
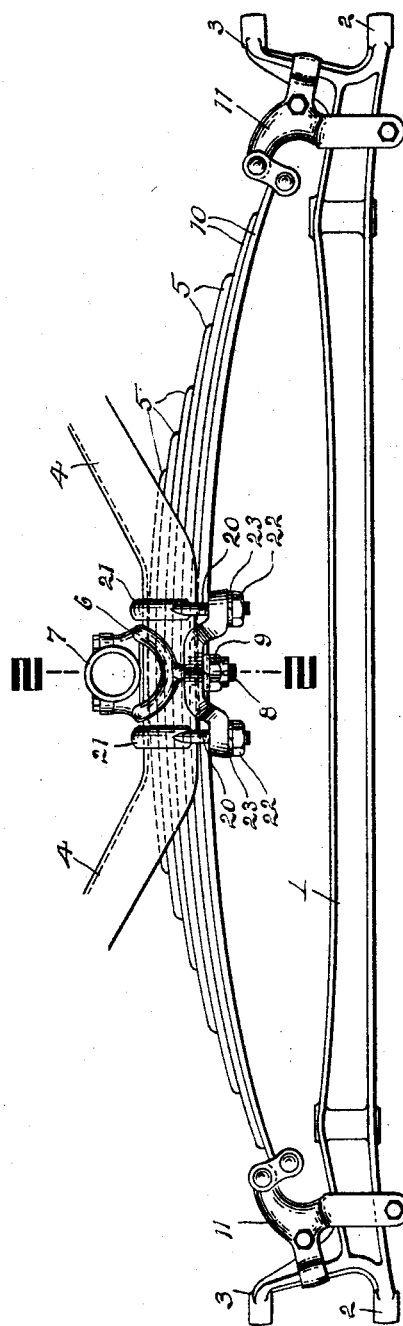
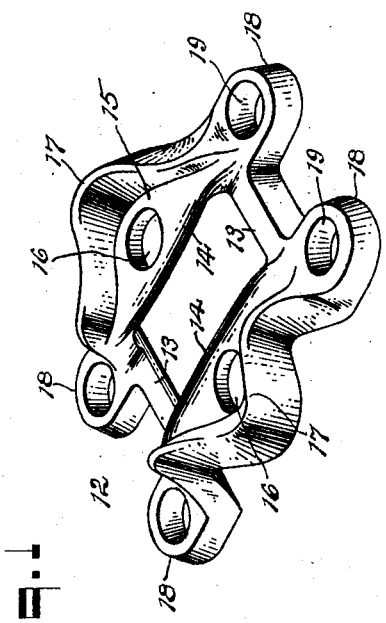
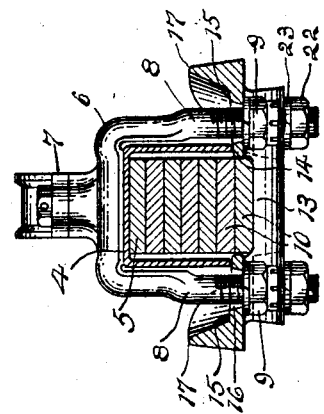
Inventor
Louis Obrecht
By
Attorney Patented Dec. 15, 1925.

1,565,385

UNITED STATES PATENT OFFICE.

LOUIS OBRECHT, OF ASHLAND, MASSACHUSETTS.

SPRING ATTACHMENT.

Application filed April 4, 1925. Serial No. 20,636.

*To all whom it may concern:*

Be it known that I, LOUIS OBRECHT, a citizen of the United States, residing at Ashland, in the county of Middlesex and State of Massachusetts, have invented certain new and useful Improvements in Spring Attachments, of which the following is a specification, reference being had therein to the accompanying drawings.

A motor vehicle known as the Ford automobile, has been on the market for a number of years and is well known as a light car of small carrying capacity due partially to the weakness of its load carrying springs. It is an object of the present invention to provide means whereby the strength of the spring suspension in this particular type of automobile, may be increased and thereby increase the carrying capacity of the motor vehicle. A further object is to provide means whereby, by the addition of a minimum number of new parts, the carrying capacity of the suspension spring or springs is greatly increased, and further, whereby an additional leaf or leaves may be added to those of the old or regular standard spring, increasing the carrying capacity of the spring suspension without change in the standard parts or construction of the Ford car.

With the above and other ends in view, the invention consists in providing an additional spring leaf or leaves and a plate constructed to receive the added leaf or leaves and form a seat therefor, and at the same time provide suitable ears to receive securing clips and also provided with openings to receive the usual bearing clip, said openings being in parts of the plate which parts are above the horizontal plane of the ears and are arranged to engage the lower edges of flanges of a cross channel frame member within which the usual spring leaves are seated. The invention further consists in certain other new and useful features, all as hereinafter more fully set forth and particularly pointed out in the appended claims, reference being had to the accompanying drawing in which—

Figure 1 is a front elevation of the front axle of a Ford car and a portion of the chassis frame thereof, showing a spring suspension structure embodying the present invention as applied thereto;

Figure 2 is an enlarged transverse section substantially upon the line 2—2 of Figure 1; and Figure 3 is a perspective view of a spring seat member or plate.

As shown in the drawing, the well known Ford motor car embodies a front axle 1 having a yoke at each end for the steering knuckles (not shown) of the front steering wheels of the vehicle, said yokes each comprising a longitudinally extending arm 2 and an upwardly extending arm 3 between which arms the steering knuckles are pivotally mounted in the usual manner. 4 indicates the usual transverse cross member of the chassis frame, which member is channel shape in cross-section to receive within it the leaves 5 of a transverse suspension spring, which in the usual construction, is connected by suitable shackles and supporting arms (not shown) to the axle 1 at a distance inward from the yoke arms at the ends of the axle. These leaves 5 are usually secured intermediate their ends within the channel of the frame member 4 by means of a clip member 6 arranged to embrace the member 4 and formed at each side of the frame member are clip bolts 8 which are screw-threaded at their lower ends to receive nuts 9, the bolts being just long enough in the usual construction to pass through a spring plate (not shown) beneath the leaves and frame member so that by turning up the nuts 9 against the plate, the leaves are securely clamped within the channel of the frame member.

The front spring of the Ford car is usually designed to carry only a comparatively light load and is of comparatively short length. Because of this short length, the usual Ford spring is rather stiff and has a quick rebound which imparts to the body the shocks and jars occasioned by inequalities in the road and the carrying capacity of the car is limited by the capacity of the spring.

It is often desirable to carry loads greater than that for which the spring was designed and to provide a spring which will carry such overload with a minimum transmission of shocks and jars to the body, compatible with the spring design and ready application of the substituted spring, with a minimum of change in the standard construction, substitution of parts and cost of such parts and installation. To that end, I add one or more leaves 10 to the standard spring, increasing the over-all length of the spring, and provide suitable brackets 11 for attaching the ends of the spring to the axle 1 adjacent the arms 3 at the ends thereof. The addition of the leaves 10 increases the over-all thickness of the spring beyond that of the original spring, and to firmly secure this increased thickness of spring to the frame cross-member 4, I provide a casting or spring plate 12 shown in detail in Figure 3, which plate or member forms a guide and seat for the added leaves 10. This member is formed with a drop-center portion of transverse bars 13 forming a seat for the lower leaf and which bars connect side portions or ledges 14 which are raised above the horizontal plane of the upper surfaces or seat upon which the lower leaf seats with the side edges of this leaf 10 engaging the inner sides of these ledges 14 to guide and hold the leaf in alignment with the leaves above, these ledges 14 being raised above the plane of the seat for the lower leaf sufficiently to nearly engage the lower edges of the side flanges of the cross-member 4 of the frame when the parts are in place, and these ledges are extended laterally to provide ears 15 having openings 16 to receive the clip bolts 8 of the clip 6 of the original construction. These ears 15 are reinforced and strengthened by marginal flanges 17, and being raised about the plane of the seat for the lower leaf, are in the plane of the clip plate of the original construction so that it is unnecessary to provide a new clip to replace the clip 6, the clip bolts 8 then being long enough to extend through the ears 15 sufficiently to receive the nuts 9 which are drawn up against the lower surface of these ears to firmly clamp the upper leaves 5 of the spring within the channel of the member 4 and also clamp the added leaves 10 in place.

The member 12 is also formed with laterally extending ears 18 at its ends having openings 19 for the screwthreaded ends 20 of a pair of spring clips 21 to be engaged by nuts 22 and lock washers 23 interposed between the nuts and the lower surfaces of said ears.

By the use of this clip plate member 12 constructed as described, the added or lower spring leaves may be securely fastened in place without discarding many of the parts of the original construction, it being only necessary to substitute the member 12 for the original spring plate, this member making it possible to use the original clip bearing 6 and the end ears 18 making it possible to employ clips 21 to further strengthen the fastening of the spring to the cross member 4 of the chassis frame. The ledges 14 also provide a guide for the lower leaves which are not enclosed within the channel of the member 4 and prevent these leaves from twisting out of the plane of the leaves above. A strong, rigid construction is also provided by forming the ears 15 with the marginal upstanding ribs 17.

What I claim is:—

In a spring attachment wherein a channel cross-member of the chassis frame is provided to receive the leaves of a cross spring seated within said channel and a bearing clip is formed with clip bolts extending downwardly at each side of said channel member; a clip member formed with an intermediate portion forming a seat for the lower leaf of the spring and ledges at the sides of said seat to engage the side edges of the leaf, said ledges being extended laterally to form ears located in a horizontal plane above the plane of said seat and provided with openings to receive the clip bolts, said ears being also formed with marginal ribs, and said clip member being also formed with end ears having openings to receive a pair of clips to engage over the frame member at each side of said bearing clip.

In testimony whereof I affix my signature.

LOUIS OBRECHT.